United States Patent [19]

Motogami et al.

[11] Patent Number: 5,098,589

[45] Date of Patent: Mar. 24, 1992

[54] ION-CONDUCTIVE POLYMER ELECTROLYTE

[75] Inventors: Kenji Motogami, Takatsuki; Shigeo Mori, Kyoto, both of Japan

[73] Assignee: Dai-Ichi Kogyo Seiyaku Co., Ltd., Kyoto, Japan

[21] Appl. No.: 602,410

[22] Filed: Oct. 22, 1990

[30] Foreign Application Priority Data

Oct. 26, 1989 [JP] Japan .................................. 1-280721
Oct. 26, 1989 [JP] Japan .................................. 1-280722

[51] Int. Cl.$^5$ ......................... H01G 4/18; C08L 71/02
[52] U.S. Cl. .................... 252/62.2; 429/192; 429/213; 523/333; 523/401
[58] Field of Search ............... 429/192; 252/62.2, 521, 252/182.1; 523/333, 401

[56] References Cited

U.S. PATENT DOCUMENTS 4,303,748 12/1981 Armand .............................. 429/192
4,303,748 12/1981 Armand et al. .
4,556,614 12/1985 le Méhauté ........................ 429/191
4,990,413 2/1991 Lee ..................................... 252/62.2

FOREIGN PATENT DOCUMENTS 83249 4/1986 Japan .
249361 10/1987 Japan .
136408 6/1988 Japan .

Primary Examiner—Prince Willis, Jr.
Assistant Examiner—Thomas Steinberg
Attorney, Agent, or Firm—Morgan & Finnegan

[57] ABSTRACT

An ion-conductive polymer electrolyte comprises an organic polymer and a soluble electrolyte salt. The organic polymer is obtained by crosslinking an organic compound having an average molecular weight of 1,000 to 20,000 and having a structure of the following formula (1);

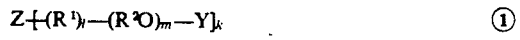

in which
Z is a residue of a compound having at least one active hydrogen,
$R^1$ is represented by the following formula (2);

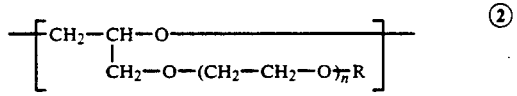

wherein
n is 0 or an integer of 1 to 25, R is an alkyl, alkenyl, aryl or alkylaryl group having 1 to 20 carbon atoms;
$R^2$ is an alkylene having not less than 2 carbon atoms,
Y is a hydrogen atom or a polymerizable functional group,
k is an integer of 1 to 12,
l is an integer of 1 to 230,
m is an integer of 1 to 300, and
$l/(l+m) \geq 0.1$.

6 Claims, No Drawings

ION-CONDUCTIVE POLYMER ELECTROLYTE

BACKGROUND OF THE INVENTION

This invention relates to an ion-conductive polymer electrolyte.

As an ion-conductive polymer electrolyte, there has been known following compounds. For example, an organic polymer electrolyte of polyethylene oxide type; an organic polymer electrolyte having a multifunctional polyether molecular structure prepared by a randam copolymerization of ethylene oxide portion and propylene oxide portion (Japanese Laid-Open Patent Publication No. 249,361); an ion-conductive polymer electrolyte comprising a branched polyethylene oxide prepared by adding ethylene oxide as the side chain to a main chain of polyethylene oxide (Japanese Laid-Open Patent Publication No. 136,408); a solid polymer electrolyte comprising an ethylene oxide copolymer containing an ionic compound in dissolved state (Japanese Laid-Open Patent Publication No. 83,249 of 1986); and an ion-conductive polymer electrolyte in which a high polymer solid substance having plasticity is further constituted substantially with a branched-chain of a homopolymer or copolymer which is thermoplastic and has no cross linkage (Japanese Laid-Open Patent Publication No. 98,480 of 1980).

However, those conventional ion-conductive polymer electrolytes have the following problems.

First, the organic polymer electrolyte of polyethylene oxide type shows a relatively good lithium-ion conductivity in the temperature range of not lower than 40° C., but the characteristic is lowered rapidly at the room temperature range of about 25° C. Accordingly, it is very difficult that the electrolyte is used for various applications such as battery, electrochromic and the like.

The organic polymer electrolytes described in Japanese Laid-Open Patent Publication No. 249,361 of 1987 and Japanese Laid-Open Patent Publication No. 136,408 of 1988 do not show rapid lowering of the lithium-ion conductivity at the room temperature range of about 25° C., but the lowering proceeds at a temperature of not higher than 0° C. which is considered as a practical temperature range. Therefore, a practical ion-conductivity can not be obtained.

The organic polymer electrolyte described in Japanese Laid-Open Patent Publication No. 83,249 of 1986 is an organic polymer prepared by a random-copolymerization of ethylene oxide with the other monomer. The structure of the organic polymer resultantly becomes amorphous as a result by the random-copolymerization, but an amorphous part and non-amorphous part are localized in the organic polymer by the difference of reactivity between each monomers so that the product quality tends to be unstable.

Further, since the organic polymer electrolyte described in Japanese Laid-Open Patent Publication No. 98,480 of 1980 is thermoplastic, a film formed with it is limited only to be simple and a good adhesion between the film and the electrode can not be obtained.

The object of the present invention is to solve such problems as described above and to provide an ion-conductive polymer electrolyte which shows an excellent ion conductivity and can be easily handled.

SUMMARY OF THE INVENTION

The ion-conductive polymer electrolyte according to the invention comprises an organic polymer and a soluble electrolyte salt. The organic polymer is obtained by crosslinking an organic compound having an average molecular weight of 1,000 to 20,000 and having a structure of the following formula (1);

in which
Z is a residue of a compound having at least one active hydrogen,
$R^1$ is a structure of the following formula (2);

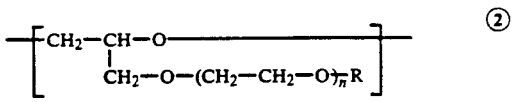

wherein
n is 0 or an integer of 1 to 25, R is an alkyl, alkenyl, aryl or alkylaryl group having 1 to 20 carbon atoms;
$R^2$ is an alkylene having not less than 2 carbon atoms,
Y is a hydrogen atom or a polymerizable functional group,
k is an integer of 1 to 12,
l is an integer of 1 to 230,
m is an integer of 1 to 300, and
$1/(l+m) \geq 0.1$.

The organic polymer may be obtained by crosslinking the compound having a structure of the formula (1) either with or without a crosslinking agent.

DETAILED DESCRIPTION OF THE INVENTION

Thus, the ion-conductive polymer electrolyte according to the present invention is characterized in comprising an organic polymer prepared by crosslinking the specific compound having a structure of the formula (1) and a soluble electrolyte salt.

The organic compound having a structure of the formula (1) may be obtained by the method in which an active hydrogen compound is reacted with glycidyl ethers and at least one alkylene oxides having not less than 2 carbon atoms to produce a polyether compound, and then, if necessary, the polyether compound is reacted with a compound having a polymerizable functional group to introduce the polymerizable functional group to the end of the main chain of the polyether compound.

The above polyether compound may be used itself as the organic compound having a structure of the formula (1) in which Y is a hydrogen atom.

As the active hydrogen compounds, there are exemplified the following compounds; such as polyhydric alcohols, e.g., ethylene glycol, propylene glycol, 1,4-butanediol, glycerol, trimethylolpropane, sorbitol, sucrose, polyglycerol and the like; amine compounds, e.g., butylamine, 2-ethylhexylamine, ethylenediamine, hexamethylenediamine, diethylenetriamine, triethylenetetramine, tetraethylenepentamine, pentaethylenehexamine, aniline, benzylamine, phenylenediamine and the like; phenolic active hydrogen compounds, e.g., Bisphenol A, hydroquinone, novolac and the like; compounds having different active hydrogen-containing groups in the molecule, e.g., monoethanolamine, diethanolamine and the like. Among them, polyhydric alcohols are particularly preferred.

Next, as the glycidyl ethers to be reacted with the active hydrogen compounds, there are exemplified the following compounds; such as alkyl-, alkenyl-, aryl- or alkylaryl-polyethylene glycol glycidyl ethers represented by the following formula;

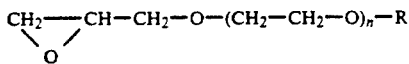

wherein R and n are the same as in the general formula (2). The typical compounds are represented by the above formula in which R is a straight-chain alkyl such as methyl, ethyl, propyl, butyl and the like; a branched alkyl such as isopropyl, sec-butyl, tert-butyl and the like; an alkenyl such as vinyl, allyl, 1-propenyl, 1,3-butadienyl and the like; or an aryl or alkylaryl such as phenyl, naphthyl, nonylphenyl, tolyl, benzyl and the like. Particularly, the compounds represented by the above formula in which n is an integer of 1 to 15 and R has 1 to 12 carbon atoms are preferably used.

Further, as the alkylene oxides having not less than 2 carbon atoms which is used to obtain the organic compound represented by the formula (1) as well as the glycidyl ethers, there are exemplified the following compounds; α-olefin oxides having 4 to 9 carbon atoms such as ethylene oxide, propylene oxide, 1,2-epoxybutane, 1,2-epoxypentane, 1,2-epoxyhexane, 1,2-epoxyheptane, 1,2-epoxyoctane, 1,2-epoxynonane and the like; α-olefin oxides having not less than 10 carbon atoms; styrene oxides and the like. Among them, α-olefin oxides having 2 to 20 carbon atoms are preferably used.

As to the quantitative relationship between $R^1$ unit (glycidyl ethers) and $R^2O$ unit (alkylene oxides) in the organic compound represented by the general formula (1), it is necessary that l is an integer of 1 to 230, m is an integer of 1 to 300 and $l/(l+m) \geq 0.1$. However, the sequence of $R^1$ unit and $R^2O$ unit is not particularly limited. Therefore, each unit may be arranged randomly or arranged to form a block structure.

However, when $R^2$ is an alkylene having 2 or 3 carbon atoms, it is preferable that l is an integer of 1 to 220, m is an integer of 1 to 240 and $l/(l+m) \geq 0.3$. On the other hand, when $R^2$ is an alkylene having not less than 4 carbon atoms, it is preferable that $l/(l+m) \geq 0.2$.

As the catalysts which may be used in the reaction of glycidyl ethers and alkylene oxides having not less than 2 carbon atoms, there are generally exemplified basic catalysts such as sodium methylate, sodium hydroxide, potassium hydroxide, lithium carbonate and the like. However, acidic catalysts such as boron trifluoride and the like, and amine catalysts such as trimethylamine, triethylamine and the like are also useful.

Furthermore, if necessary, a polymerizable functional group is introduced to the end of the main chain of the polyether compound obtained above. Among the polymerizable functional groups, there are included an alkenyl such as vinyl and the like; a group having an unsaturated bond such as acryloyl, methacryloyl and the like; a group having a straight chain or cyclic portion containing Si and the like. These groups are introduced into the molecule by reacting the above polyether compound with a compound having the polymerizable functional group.

As the compounds having the polymerizable functional group, there are exemplified the following compounds; such as compounds having at least one carboxyl group and at least one unsaturated bond in the molecule, e.g., acrylic acid, methacrylic acid, cinnamic acid, maleic acid, fumaric acid, itaconic acid, p-vinyl benzoic acid and the like; and/or anhydrides of the above compounds, e.g., maleic anhydride, itaconic anhydride and the like; and/or acid chlorides of the above compounds; glycidyls, e.g., allyl glycidyl ether, glycidyl methacrylate and the like; isocyanates, e.g., methacryloyl isocyanate and the like; the compouns containing Si, e.g., dichlorosilane, dimethyl vinylchlorosilane and the like.

It is required that the average molecular weight of the organic compounds having a structure of the formula (1) thus prepared is within the range of 1,000 to 20,000. If the average molecular weight of the organic compounds is not within the range described above, it is difficult to obtain the desired advantages of the invention.

In the organic compounds having a structure of the formula (1), k corresponds to the number of active hydrogen atoms in the active hydrogen compound and is an integer of 1 to 12.

The crosslinking reaction of the organic compound having a structure of the formula (1) in which Y is a hydrogen atom may be carried out by using a crosslinking agent.

As the crosslinking agents, there are exemplified the following compounds; such as 2,4-tolylene diisocyanate (2,4-TDI), 2,6-tolylene diisocyanate (2,6-TDI), 4,4'-diphenylmethane diisocyanate (MDI), hexamethylene diisocyanate (HMDI), isophorone diisocyanate, triphenylmethane triisocyanate, tris(isocyanatephenyl)thiophosphate, lysine ester triisocyanate, 1,8-diisocyanate-4-isocyanatemethyloctane, 1,6,11-undecane triisocyanate, 1,3,6-hexamethylene triisocyanate, bicycloheptane triisocyanate, biuret-bonded HMDI, isocyanurate-bonded HMDI, an adduct of trimethylolpropane with 3 moles of TDI and the mixture thereof.

When an isocyanate compound is used as the crosslinking agent, it is generally used in such an amount as the number of isocyanate group becomes 1 to 1.5 times, preferably 1.1 to 1.3 times, of the number of the active hydrogen atoms in the organic compound.

Further, to complete rapidly the crosslinking reaction, it is preferred to use a catalyst. Among the catalysts, there are included such as organic metal catalysts, e.g., dibutyltin dilaurate (DBTDL), dibutyltin diacetate (DBTA), salt of phenyl mercury propionic acid, lead octenate and the like; amine catalysts, e.g., triethylenediamine, N,N'-dimethylpiperazine, N-methylmorpholine, tetramethyl guanidine, triethylamine and the like.

When the organic compound has a polymerizable functional group as Y in the formula (1), the crosslinking reaction may be carried out with heat, light, electronic ray or the like. If necessary, a polymerization initiator and/or a sensitizer may be used.

As the soluble electrolyte salt doped into the organic polymer obtained by the crosslinking reaction of the organic compounds having a structure of the general formula (1), there are exemplified the following compounds; such as inorganic-ion salts containing at least one metal element selected from the group consisting of Li, Na, K, Cs, Ag, Cu and Mg, e.g., LiI, LiCl, LiClO$_4$, LiSCN, LiBF$_4$, LiAsF$_6$, LiCF$_3$SO$_3$, LiC$_6$F$_{13}$SO$_3$, LiCF$_3$CO$_2$, LiHgI$_3$, NaI, NaSCN, NaBr, KI, CsSCN, AgNO$_3$, CuC$_{12}$Mg(ClO$_4$)$_2$ and the like; organic-ion salts, e.g., lithium stearylsulfate, sodium octylsulfate, lithium dodecylbenzenesulfate, sodium naphthalenesulfate, lithium dibutylnaphthalenesulfate, potassium octylnaphthalenesulfate, potassium dodecylnaphthalenesulfate and the like.

The used amount of the soluble electrolyte salt is 0.0001~5.0 mol (preferably 0.005~2.0 mol) per the number of ether-bond oxygen comprised in the above organic polymer. When the soluble electrolyte salt is added in too high ratio, excess of the soluble electrolyte salt such as inorganic-ion salt does not dissociate but merely is present as a mixture and resultantly the ionic conductivity is adversely lowered.

The soluble electrolyte salts may be used solely or in combination. The method for doping is also not restricted but it is generally convenient that the salts are dissolved in an organic solvent such as methyl ethyl ketone (MEK), tetrahydrofuran (THF) and the like and mixed with the organic polymers uniformly and then the organic solvent is removed under reduced pressure.

According to the present invention, since the organic polymer electrolyte contains the unit having the specific structure represented by $R^1$ and the alkylene oxide chain represented by $R^2O$, the structure of the organic polymer is made to be completely amorphous so that the glass transition point (Tg value) of the organic polymer electrolyte can be lowered and the crystallization temperature is lowered. When a lithium salt is used as the soluble electrolyte salt, the movement of the lithium ion is made easy and the lithium-ion conductivity in a temperature range of not higher than room temperature can be remarkably improved.

With respect to the lithium-ion conductivity, it is believed that, since the unit represented by $R^1$ has ether-bond oxygens in the side chain as well as in the main chain, the movement of the lithium cation occurs through this part and the movement of the lithium cation contributes to the improvement of the lithium-ion conductivity.

Further, it is preferable to use ethylene oxide and/or propylene oxide as at least one part of alkylene oxide chain represented by $(R^2O)_m$, because the cost for producing the organic polymer can be lowered and an ion-conductive polymer electrolyte excellent in practical utility can be obtained.

PREFERRED EMBODIMENTS OF THE INVENTION

The following examples serve to illustrate the invention in more detail although the invention is not limited to the examples. Unless otherwise indicated, % signifies % by weight, and the number of each of l and m shows an average.

The ion conductivity of the product obtained in each example was evaluated by the following test.

LITHIUM-ION CONDUCTIVITY TEST

An organic polymer electrolyte was interposed between platinum electrodes, and the alternating current impedance between electrodes was measured, and the complex impedance was analyzed. As the measuring instrument, Impedance Analyzer (type: 4192A, manufactured by Yokogawa Hewlett-Packard Company) was used and the measurement was carried out under the condition in which the applied voltage was 10 mV and the measuring frequency was 5 Hz to 13 MHz.

EXAMPLE 1

15 g of glycerol as a starting material was reacted with 370 g of 1,2-epoxybutane in the presence of 1.3 g of potassium hydroxide as a catalyst, and then reacted with 285 g of methyltriethylene glycol glycidyl ether represented by the following formula.

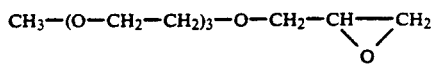

The product was purified by desalting to obtain 509 g of a polyether having an average molecular weight of 3,740 (calculated by hydroxide value).

The polyether and the 1.1 equivalent weight of acrylic acid to the hydroxide number of the polyether were added to benzene the used amount of which is identical with that of the acrylic acid. The mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of terminal-acrylated polyether having a molecular weight of 3,904 and a structure of the formula 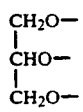, in which

Z:

$$\begin{array}{l} CH_2O-\\ |\\ CHO-\\ |\\ CH_2O- \end{array}$$

$R^1$:

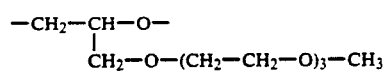

l: 2.4
carbon number of $R^2$: 4
m: 9.6
$l/(l+m)$: 0.2
Y: OCCH=CH$_2$
k: 3, was confirmed by measuring the bromine value and the saponification value.

3.6 g of thus obtained terminal-acrylated polyether, 0.12 g of LiClO$_4$ (0.018 mole/ether-bond oxygen) and 1% of a polymerization initiator were dissolved in 3 ml of methyl ethyl ketone and allowed to stand for 1 hour at 80° C. in a stream of nitrogen gas under atmospheric pressure. Then the solution was heat-treated for 8 hours at the same temperature in vacuum degree of below 1×10$^{-3}$ Torr to remove methyl ethyl ketone, and resultantly an ion-conductive polymer electrolyte having a thickness of 42 μm was obtained.

EXAMPLE 2

23 g of sorbitol as a starting material was reacted with 1,477 g of the mixture comprising methylhexaethylene glycol glycidyl ether represented by the following formula $$\text{CH}_2\underset{\diagdown\ \diagup}{\underset{O}{\text{—}}}\text{CH—CH}_2\text{—O—(CH}_2\text{—CH}_2\text{—O)}_6\text{—CH}_3$$

and α-olefin oxide having 12 carbon atoms (molar ratio 1:1) in the presence of 3 g of potassium hydroxide as a catalyst. The product was purified with desalting to obtain 1,021 g of a polyether having an average molecular weight of 11,480 (calculated by hydroxide value).

The polyether and the 1.1 equivalent weight of methacrylic acid to the hydroxide number of the polyether were added to benzene the used amount of which is identical with that of the methacrylic acid. The mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-methacrylated polyether having an average molecular weight of 11,890 and a structure of the formula ①, in which

Z:

$$\begin{array}{c}\ \ \ \ \ \ \ \ \ \ \ \ \ \ \ \ \ \ \ |\\ \ \ \ \ \ \ \ \ \ \ \ \ \ \ \ \ \ \ O\\ \ \ \ \ \ \ \ \ \ \ \ \ \ \ \ \ \ \ |\\ \text{CH}_2\text{—CH—CH—CH—CH—CH}_2\\ |\ \ \ \ |\ \ \ \ \ \ \ \ \ \ \ |\ \ \ \ |\ \ \ \ |\\ O\ \ O\ \ \ \ \ \ \ \ \ O\ \ O\ \ O\\ |\ \ \ \ |\ \ \ \ \ \ \ \ \ \ \ |\ \ \ \ |\ \ \ \ |\end{array}$$

$R^1$:

$$-\text{CH}_2\text{—CH—O—}\\ \ \ \ \ \ \ \ \ \ \ \ \ \ |\\ \ \ \ \ \ \ \ \ \ \ \ \text{CH}_2\text{—O—(CH}_2\text{—CH}_2\text{—O)}_6\text{—CH}_3$$

l: 3.5
carbon number of $R^2$: 12
m: 3.5
l/(l+m): 0.5
Y: $OCC(CH_3)=CH_2$
k: 6, was confirmed by measuring the bromine value and the saponification value.

3.6 g of thus obtained terminal-methacrylated polyether, 0.28 g of LiClO$_4$ (0.044 mole/ether-bond oxygen number) and 1% of a polymerization initiator were dissolved in 3 ml of methyl ethyl ketone and allowed to stand for 10 hours at 80° C. in a stream of nitrogen gas under atmospheric pressure. Then the solution was heat-treated for 8 hours at the same temperature in vacuum degree of below $1 \times 10^{-3}$ Torr to remove methyl ethyl ketone, and resultantly an ion-conductive polymer electrolyte having a thickness of 41 μm was obtained.

EXAMPLE 3

30 g of glycerol as a starting material was reacted with 2,300 g of methyldiethylene glycol glycidyl ether represented by the following formula $$\text{CH}_2\underset{\diagdown\ \diagup}{\underset{O}{\text{—}}}\text{CH—CH}_2\text{—O—(CH}_2\text{—CH}_2\text{—O)}_2\text{—CH}_3$$

in the presence of 5.3 g of potassium hydroxide as a catalyst, and then reacted with 330 g of 1,2-epoxyhexane. The product was purified with desalting to obtain 2,261 g of a polyether having an average molecular weight of 7,290 (calculated by hydroxide value).

The polyether and the 1.1 equivalent weight of acrylic acid to the hydroxide number of the polyether were added to benzene the used amount of which is identical with that of the acrylic acid. The mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-acrylated polyether having an average molecular weight of 7,454 and a structure of the formula ①, in which

Z:

$$\text{CH}_2\text{O—}\\ |\\ \text{CHO—}\\ |\\ \text{CH}_2\text{O—}$$

$R^1$:

$$-\text{CH}_2\text{—CH—O—}\\ \ \ \ \ \ \ \ \ \ \ \ \ \ |\\ \ \ \ \ \ \ \ \ \ \ \ \text{CH}_2\text{—O—(CH}_2\text{—CH}_2\text{—O)}_2\text{—CH}_3$$

l: 36
carbon number of $R^2$: 6
m: 9
l/(l+m): 0.8
Y: $OCCH=CH_2$
k: 3, was confirmed by measuring the bromine value and the saponification value.

3.6 g of thus obtained terminal-acrylated polyether, 0.15 g of LiClO$_4$ (0.019 mole/ether-bond oxygen number) and 1% of a sensitizer were dissolved in 3 ml of methyl ethyl ketone and then the mixture was poured into a flat vessel. Then methyl ethyl ketone was removed under reduced pressure and the product was irradiated with a 250 W extra-high pressure mercury lamp for 6 mW/cm$^2 \times 2$ minutes in a stream of nitrogen gas under atmospheric pressure, and resultantly an ion-conductive polymer electrolyte having a thickness of 49 μm was obtained.

EXAMPLE 4

30 g of glycerol as a starting material was reacted with 2,300 g of methyldiethylene glycol glycidyl ether represented by the following formula

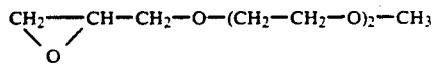

in the presence of 5.3 g of potassium hydroxide as a catalyst, and then reacted with 330 g of 1,2-epoxyhexane. The product was purified with desalting to obtain 2,261 g of a polyether having an average molecular weight of 7,290 (calculated by hydroxide value) and a structure of the formula (1), in which

Z:

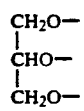

$CH_2O-$
$CHO-$
$CH_2O-$

R¹:

$-CH_2-CH-O-$
$\quad\quad\quad |$
$\quad\quad\quad CH_2-O-(CH_2-CH_2-O)_2-CH_3$ l: 36
carbon number of R²: 6
m: 9
l/(l+m): 0.8
Y: H
k: 3.

3.6 g of thus obtained polyether, 0.15 g of LiClO₄ (0.019 mole/ether-bond oxygen number), 1.5 equivalent weight of tolylene diisocyanate to the above polyether and 0.01 g of dibutyltin dilaurate were dissolved in 3 ml of methyl ethyl ketone and then the mixture was poured into a flat vessel and allowed to stand for 30 minutes at 60° C. under atmospheric pressure in a stream of nitrogen gas. Then the solution was heat-treated for 8 hours at 80° C. in vacuum degree of below 1×10⁻³ Torr to remove methyl ethyl ketone, resultantly an ion-conductive polymer electrolyte having a thickness of 39 μm was obtained.

EXAMPLE 5

31 g of ethylene glycol as a starting material was reacted with 2,590 g of the mixture comprising n-butyl-triethylene glycol glycidyl ether represented by the following formula

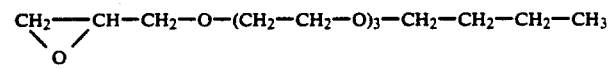

and 1,2-epoxybutane (molar ratio 3:7) in the presence of potassium hydroxide. The product was purified with desalting to obtain 2,270 g of a polyether having an average molecular weight of 5,110 (calculated by hydroxide value) and a structure of the formula (1), in which

Z:

$CH_2O-$
$CH_2O-$

R¹:

$-CH_2-CH-O-$
$\quad\quad\quad |$
$\quad\quad\quad CH_2-O-(CH_2-CH_2-O)_3-CH_2-CH_2-CH_2-CH_3$ l: 4.5
carbon number of R²: 4
m: 2.0
l/(l+m): 0.69
Y: H
k: 2.

3.6 g of thus obtained polyether and 0.06 g of NaSCN (0.020 mole/ether-bond oxygen number) were dissolved in 3 ml of methyl ethyl ketone and then the mixture was allowed to stand for 10 hours at 80° C. under atmospheric pressure in a stream of nitrogen gas. Then the solution was heat-treated for 8 hours at the same temperature in vacuum degree of below 1×10⁻³ Torr to remove methyl ethyl ketone, resultantly an ion-conductive polymer electrolyte having a thickness of 41 μm was obtained.

EXAMPLE 6

30 g of ethylenediamine as a starting material was reacted with 3,990 g of the mixture comprising phenyl-hexaethylene glycol glycidyl ether represented by the following formula

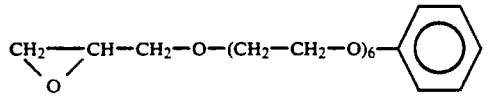

and 1,2-epoxybutane (molar ratio 2:1) in the presence of potassium hydroxide. The product was purified with desalting to obtain 3,610 g of a polyether having an average molecular weight of 7,940 (calculated by hydroxide value).

The polyether and the 1.1 equivalent weight of acrylic acid to the hydroxide number of the polyether were added to benzene the used amount of which is identical with that of the acrylic acid. The mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-acrylated polyether having an average molecular weight of 8,154 and a structure of the formula (1), in which

Z:

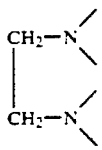

R¹:

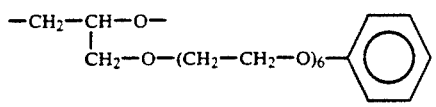

l: 2.2
carbon number of R²: 4
m: 1.1
1/(l+m): 0.67
Y: OCCH=CH₂
k: 4, was confirmed by measuring the bromine value and the saponification value.

3.6 g of thus obtained terminal-acrylated polyether and 0.11 g of LiClO₄ (0.030 mole/ether-bond oxygen) were dissolved in 3 ml of methyl ethyl ketone and allowed to stand for 10 hours at 80° C. in a stream of nitrogen gas under atmospheric pressure. Then the solution was heat-treated for 8 hours at the same temperature in vacuum degree of below 1×10⁻³ Torr to remove methyl ethyl ketone, and resultantly an ion-conductive polymer electrolyte having a thickness of 41 μm was obtained.

EXAMPLE 7

46.4 g of pentaethylenehexamine as a starting material was reacted with 1,974 g of the mixture comprising ethyltetraethylene glycol glycidyl ether represented by the following formula

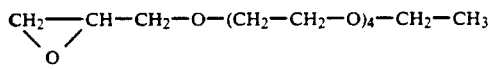

and α-olefin oxide having 12 carbon atoms (molar ratio 4:1) in the presence of potassium hydroxide as a catalyst. The product was purified with desalting to obtain 1,651 g of a polyether having an average molecular weight of 9,970 (calculated by hydroxide value).

The polyether and the 1.1 equivalent weight of methacrylic acid to the hydroxide number of the polyether were added to benzene the used amount of which is identical with that of the methacrylic acid. The mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-methacrylated polyether having an average molecular weight of 10,514 and a structure of the formula ①, in which
Z:

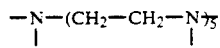

R¹:

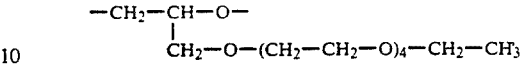

l: 3.8
carbon number of R²: 12
m: 0.9
1/(l+m): 0.8
Y: OCC(CH₃)=CH₂
k: 8, was confirmed by measuring the bromine value and the saponification value.

3.6 g of thus obtained terminal-methacrylated polyether, 0.16 g of NaClO₄ (0.020 mole/ether-bond oxygen number) and 1% of a polymerization initiator were dissolved in 3 ml of methyl ethyl ketone and allowed to stand for 10 hours at 80° C. in a stream of nitrogen gas under atmospheric pressure. Then the solution was heat-treated for 8 hours at the same temperature in vacuum degree of below 1×10⁻³ Torr to remove methyl ethyl ketone, and resultantly an ion-conductive polymer electrolyte having a thickness of 41 μm was obtained.

EXAMPLE 8

57 g of Bisphenol A as a starting material was reacted with 1,958 g of the mixture comprising phenyldiethylene glycol glycidyl ether represented by the following formula

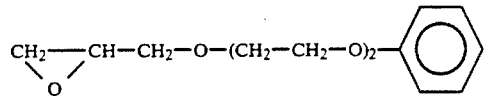

and α-olefin oxide having 6 carbon atoms (molar ratio 3:2) in the presence of potassium hydroxide as a catalyst. The product was purified with desalting to obtain 1,702 g of a polyether having an average molecular weight of 7,815 (calculated by hydroxide value) and a structure of the formula ①, in which
Z:

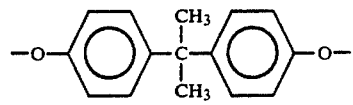

R¹:

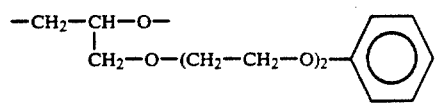

l: 12.8
carbon number of R²: 12
m: 8.5
1/(l+m): 0.6

Y: H
k: 2.

3.6 g of thus obtained polyether, 0.18 g of LiClO$_4$ (0.030 mole/ether-bond oxygen number) and 1% of a polymerization initiator were dissolved in 3 ml of methyl ethyl ketone and allowed to stand for 10 hours at 80° C. in a stream of nitrogen gas under atmospheric pressure. Then the solution was heat-treated for 8 hours at the same temperature in vacuum degree of below $1 \times 10^{-3}$ Torr to remove methyl ethyl ketone, and resultantly an ion-conductive polymer electrolyte having a thickness of 41 μm was obtained.

EXAMPLE 9

20 g of ethanolamine as a starting material was reacted with 4,990 g of the mixture comprising methyldodecaethylene glycol glycidyl ether represented by the following formula

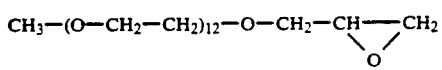

and 1,2-epoxybutane (molar ratio 1:1) in the presence of potassium hydroxide as a catalyst. The product was purified with desalting to obtain 4,378 g of a polyether having an average molecular weight of 14,090 (calculated by hydroxide value).

The polyether and the 1.1 equivalent weight of p-vinyl benzoic acid to the hydroxide number of the polyether were added to benzene the used amount of which is identical with that of the p-vinyl benzoic acid. The mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-vinylated polyether having a molecular weight of 14,478 and a structure of the formula ①, in which

Z:

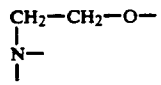

R$^1$:

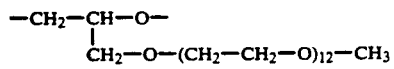

l: 7.2
carbon number of R$^2$: 4
m: 7.2
l/(l+m): 0.5
Y:

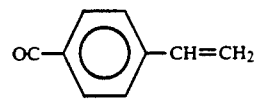

k: 3, was confirmed by measuring the bromine value and the saponification value.

3.6 g of thus obtained polyether, 0.17 g of LiClO$_4$ (0.020 mole/ether-bond oxygen) and 1% of a polymerization initiator were dissolved in 3 ml of methyl ethyl ketone and allowed to stand for 10 hours at 80° C. in a stream of nitrogen gas under atmospheric pressure. Then the solution was heat-treated for 8 hours at the same temperature in vacuum degree of below $1 \times 10^{-3}$ Torr to remove methyl ethyl ketone, and resultantly an ion-conductive polymer electrolyte having a thickness of 41 μm was obtained.

EXAMPLE 10

20 g of ethylene glycol as a starting material was reacted with the mixture comprising methyl glycidyl ether represented by the following formula

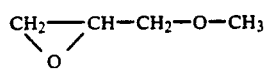

and α-olefin oxide having 4 carbon atoms (molar ratio 9:1) in the presence of 3 g of potassium hydroxide as a catalyst. The product was purified with desalting to obtain a polyether having an average molecular weight of 19,250 (calculated by hydroxide value).

The polyether and the 1.1 equivalent weight of methacrylic acid to the hydroxide number of the polyether were added to benzene the used amount of which is identical with that of the methacrylic acid. The mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-methacrylated polyether having an average molecular weight of 19,381 and a structure of the formula ①, in which

Z:

R$^1$:

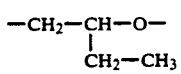

l: 96.4
carbon number of R$^2$: 4
m: 10.7
l/(l+m): 0.9
Y: OCC(CH$_3$)=CH$_2$ k: 2,
was confirmed by measuring the bromine value and the saponification value.

3.6 g of thus obtained terminal-methacrylated polyether, 0.08 g of LiClO$_4$ (0.020 mole/ether-bond oxygen number) and 1% of a polymerization initiator were dissolved in 3 ml of methyl ethyl ketone and allowed to stand for 10 hours at 80° C. in a stream of nitrogen gas under atmospheric pressure. Then the solution was heat-treated for 8 hours at the same temperature in vacuum degree of below 1×10$^{-3}$ Torr to remove methyl ethyl ketone, and resultantly an ion-conductive polymer electrolyte having a thickness of 42 μm was obtained.

COMPARATIVE EXAMPLE 1

18.4 g of glycerol as a starting material was reacted with 581.6 g of the mixture comprising ethylene oxide and propylene oxide (molar ratio 4:1) in the presence of 1.2 g of potassium hydroxide as a catalyst. Then the product was purified with desalting to obtain 459 g of a random polyether having an average molecular weight of 2,980 (calculated by hydroxide value).

3.6 g of thus obtained polyether, 0.12 g of LiClO$_4$, 1.5 equivalent weight of tolylene diisocyanate to the above polyether and 0.01 g of dibutyltin dilaurate were dissolved in 3 ml of methyl ethyl ketone and then the mixture was poured into a flat vessel and allowed to stand for 30 minutes at 60° C. under atmospheric pressure in a stream of nitrogen gas. Then the solution was heat-treated for 8 hours at 80° C. in vacuum degree of below 1×10$^{-3}$ Torr to remove methyl ethyl ketone, resultantly an ion-conductive polymer electrolyte having a thickness of 49 μm was obtained.

In each of the ion-conductive polymer electrolytes obtained in Examples 1 to 10 and Comparative Example 1, the ionic conductivity was measured. The results are shown in following Table 1.

TABLE 1

|  | Ionic conductivity (S/cm) | | |
| --- | --- | --- | --- |
|  | 20° C. | 0° C. | −20° C. |
| Example 1 | 1.0 × 10$^{-5}$ | 2.8 × 10$^{-6}$ | 4.0 × 10$^{-7}$ |
| 2 | 1.2 × 10$^{-5}$ | 2.9 × 10$^{-6}$ | 4.2 × 10$^{-7}$ |
| 3 | 1.5 × 10$^{-5}$ | 3.0 × 10$^{-6}$ | 4.5 × 10$^{-7}$ |
| 4 | 1.4 × 10$^{-5}$ | 3.1 × 10$^{-6}$ | 4.4 × 10$^{-7}$ |
| 5 | 1.1 × 10$^{-5}$ | 2.5 × 10$^{-6}$ | 3.9 × 10$^{-7}$ |
| 6 | 1.0 × 10$^{-5}$ | 2.7 × 10$^{-6}$ | 4.0 × 10$^{-7}$ |
| 7 | 1.2 × 10$^{-5}$ | 2.4 × 10$^{-6}$ | 3.7 × 10$^{-7}$ |
| 8 | 1.0 × 10$^{-5}$ | 2.2 × 10$^{-6}$ | 3.4 × 10$^{-7}$ |
| 9 | 1.1 × 10$^{-5}$ | 2.5 × 10$^{-6}$ | 3.5 × 10$^{-7}$ |
| 10 | 9.7 × 10$^{-6}$ | 2.0 × 10$^{-6}$ | 3.0 × 10$^{-7}$ |
| Comparative Example 1 | 2.5 × 10$^{-6}$ | 2.1 × 10$^{-7}$ | below 1.0 × 10$^{-8}$ |

EXAMPLE 11

30.7 g of glycerol as a starting material was reacted with 60 g of ethylene oxide in the presence of 3.3 g of potassium hydroxide as a catalyst, and then reacted with 1,576 g of the mixture comprising methyltriethylene glycol glycidyl ether represented by the following formula

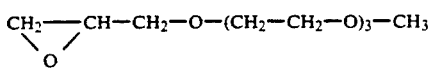

and propylene oxide (molar ratio 4:5). The product was purified with desalting to obtain 1,427 g of a polyether having an average molecular weight of 4,910 (calculated by hydroxide value).

The polyether and the 1.1 equivalent weight of acrylic acid to the hydroxide number of the polyether were added to benzene the used amount of which is identical with that of the acrylic acid. The mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-acrylated polyether having an average molecular weight of 5,073 and a structure of the formula 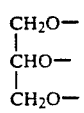, in which

Z:

CH$_2$O—
|
CHO—
|
CH$_2$O—

R$^1$:

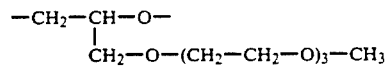

carbon number of R$^2$: 3
l: 5.7
m: 7
l/(l+m): 0.4
Y: OCCH=CH$_2$
k: 3,
was confirmed by measuring the bromine value and the saponification value.

3.6 g of thus obtained terminal-acrylated polyether, 0.12 g of LiClO$_4$ (0.015 mole/ether-bond oxygen number) and 1% of a polymerization initiator were dissolved in 3 ml of methyl ethyl ketone and allowed to stand for 1 hour at 80° C. in a stream of nitrogen gas under atmospheric pressure. Then the solution was heat-treated for 8 hours at the same temperature in vacuum degree of below 1×10$^{-3}$ Torr to remove methyl ethyl ketone, and resultantly an ion-conductive polymer electrolyte having a thickness of 50 μm was obtained.

EXAMPLE 12

46 g of glycerol as a starting material was reacted with 4,810 g of the mixture comprising methyldiethylene glycol glycidyl ether represented by the following formula

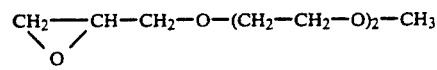

and propylene oxide (molar ratio 8:1) in the presence of 10 g of potassium hydroxide as a catalyst, and then reacted with 145 g of ethylene oxide. The product was purified with desalting to obtain 4,525 g of a polyether having an average molecular weight of 9,042 (calculated by hydroxide value).

The polyether and the 1.1 equivalent weight of methacrylic acid to the hydroxide number of the polyether were added to benzene the used amount of which is identical with that of the methacrylic acid. The mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-methacrylated polyether having an average molecular weight of 9,248 and a structure of the formula (1), in which

Z:

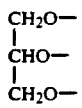

$R^1$:

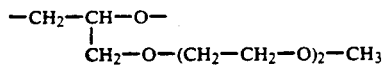

carbon number of $R^2$: 3
l: 16.3
m: 2
l/(l+m): 0.89
Y: $OCC(CH_3)=CH_2$
k: 3, was confirmed by measuring the bromine value and the saponification value.

3.6 g of thus obtained terminal-methacrylated polyether, 0.28 g of $LiClO_4$ (0.016 mole/ether-bond oxygen number) and 1% of a polymerization initiator were dissolved in 3 ml of methyl ethyl ketone and allowed to stand for 10 hours at 80° C. in a stream of nitrogen gas under atmospheric pressure. Then the solution was heat-treated for 8 hours at the same temperature in vacuum degree of below $1 \times 10^{-3}$ Torr to remove methyl ethyl ketone, and resultantly an ion-conductive polymer electrolyte having a thickness of 41 μm was obtained.

EXAMPLE 13

30.3 g of sorbitol as a starting material was reacted with 1,310 g of the mixture comprising methylhexaethylene glycol glycidyl ether represented by the following formula

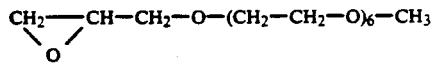

and ethylene oxide (molar ratio 3:2) in the presence of 3.3 g of potassium hydroxide as a catalyst. Then the product was purified with desalting to obtain 1,134 g of a polyether having an average molecular weight of 7,217 (calculated by hydroxide value).

The polyether and the 1.1 equivalent weight of acrylic acid to the hydroxide number of the polyether were added to benzene the used amount of which is identical with that of the acrylic acid. The mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-acrylated polyether having an average molecular weight of 7,280 and a structure of the formula (1), in which

Z:

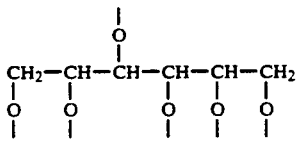

$R^1$:

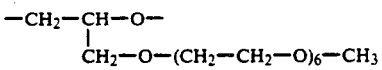

carbon number of $R^2$: 2
l: 3.1
m: 2.1
l/(l+m): 0.59
Y: $OCCH=CH_2$
k: 3, was confirmed by measuring the bromine value and the saponification value.

3.6 g of thus obtained terminal-acrylated polyether, 0.12 g of $LiClO_4$ (0.011 mole/ether-bond oxygen number) and 1% of a polymerization initiator were dissolved in 3 ml of methyl ethyl ketone and allowed to stand for 1 hour at 80° C. in a stream of nitrogen gas under atmospheric pressure. Then the solution was heat-treated for 8 hours at the same temperature in vacuum degree of below $1 \times 10^{-3}$ Torr to remove methyl ethyl ketone, and resultantly an ion-conductive polymer electrolyte having a thickness of 50 μm was obtained.

EXAMPLE 14

46 g of glycerol as a starting material was reacted with 4,810 g of methyldiethylene glycol glycidyl ether represented by the following formula

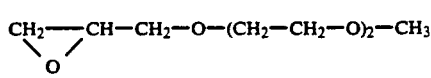

and propylene oxide (molar ratio 8:1) in the presence of 10 g of potassium hydroxide as a catalyst, and then reacted with 145 g of ethylene oxide. The product was purified with desalting to obtain 4,525 g of a polyether having an average molecular weight of 9,042 (calculated by hydroxide value) and a structure of the formula (1), in which
Z:

$$\begin{array}{l}CH_2O-\\|\\CHO-\\|\\CH_2O-\end{array}$$

R$^1$:

$$-CH_2-CH-O-\\ \quad\quad |\\ \quad\quad CH_2-O-(CH_2-CH_2-O)_2-CH_3$$

carbon number of R$^2$: 3
l: 16.3
m: 2
l/(l+m): 0.89
Y: H
k: 3.

3.6 g of thus obtained polyether, 0.28 g of LiClO$_4$, 1.5 equivalent weight of tolylene diisocyanate to the above polyether and 0.01 g of dibutyltin dilaurate were dissolved in 3 ml of methyl ethyl ketone and then the mixture was poured into a flat vessel and allowed to stand for 30 minutes at 60° C. under atmospheric pressure in a stream of nitrogen gas. Then the solution was heat-treated for 8 hours at 80° C. in vacuum degree of below 1×10$^{-3}$ Torr to remove methyl ethyl ketone, resultantly an ion-conductive polymer electrolyte having a thickness of 39 μm was obtained.

EXAMPLE 15

30 g of ethylene glycol as a starting material was reacted with 243 g of propylene oxide in the presence of potassium hydroxide and then reacted with 2,146 g of methyltriethylene glycol glycidyl ether represented by the following formula $$CH_2\!-\!\!-\!CH-CH_2-O-(CH_2-CH_2-O)_3-CH_3\\ \;\;\backslash\;\;/\\ \;\;\;O$$

and the product was purified with desalting to obtain 2,098 g of a polyether having an average molecular weight of 4,680 (calculated by hydroxide value).

The polyether and the 1.1 equivalent weight of acrylic acid to the hydroxide number of the polyether were added to benzene the used amount of which is identical with that of the acrylic acid. The mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-acrylated polyether having an average molecular weight of 4,790 and a structure of the formula ①, in which

Z:

$$\begin{array}{l}CH_2O-\\|\\CH_2O-\end{array}$$

R$^1$:

$$-CH_2-CH-O-\\ \quad\quad |\\ \quad\quad CH_2-O-(CH_2-CH_2-O)_3-CH_3$$

carbon number of R$^2$: 3
l: 10
m: 4.3
l/(l+m): 0.7
Y: OCCH=CH$_2$
k: 2, was confirmed by measuring the bromine value and the saponification value.

3.6 g of thus obtained terminal-acrylated polyether, 0.13 g of LiClO$_4$ (0.015 mole/ether-bond oxygen) and 1% of a polymerization initiator were dissolved in 3 ml of methyl ethyl ketone and allowed to stand for 10 hours at 80° C. in a stream of nitrogen gas under atmospheric pressure. Then the solution was heat-treated for 8 hours at the same temperature in vacuum degree of below 1×10$^{-3}$ Torr to remove methyl ethyl ketone, and resultantly an ion-conductive polymer electrolyte having a thickness of 41 μm was obtained.

EXAMPLE 16

20 g of ethylenediamine as a starting material was reacted with 190 g of ethylene oxide in the presence of potassium hydroxide and then reacted with 2,266 g of n-butyltriethylene glycol glycidyl ether represented by the following formula $$CH_2\!-\!\!-\!CH-CH_2-O-(CH_2-CH_2-O)_3-CH_2-CH_2-CH_2-CH_3\\ \;\;\backslash\;\;/\\ \;\;\;O$$

and further reacted with 190 g of ethylene oxide. Then the product was purified with desalting to obtain a polyether having an average molecular weight of 7,890 (calculated by hydroxide value) and a structure of a formula ①, in which

Z:

$$\begin{array}{l}\quad\quad\;\;/\\ CH_2-N\\ |\quad\quad\backslash\\ |\quad\quad /\\ CH_2-N\\ \quad\quad\;\;\backslash\end{array}$$

R$^1$:

$$-CH_2-CH-O-\\ \quad\quad |\\ \quad\quad CH_2-O-(CH_2-CH_2-O)_3-CH_2-CH_2-CH_2-CH_3$$

carbon number of R$^2$: 2
l: 6.5
m: 6.5
l/(l+m): 0.5
Y: H
k: 4.

3.6 g of thus obtained polyether, 0.15 g of LiClO$_4$ (0.020 mole/ether-bond oxygen number), 1.5 equivalent weight of tolylene diisocyanate to the above polyether and 0.01 g of dibutyltin dilaurate were dissolved in 3 ml of methyl ethyl ketone and then the mixture was poured into a flat vessel and allowed to stand for 30 minutes at 60° C. under atmospheric pressure in a stream of nitrogen gas. Then the solution was heat-treated for 8 hours at 80° C. in vacuum degree of below 1×10$^{-3}$ Torr to remove methyl ethyl ketone, resultantly an ion-conductive polymer electrolyte having a thickness of 41 μm was obtained.

EXAMPLE 17

50 g of pentaethylenehexamine as a starting material was reacted with 1,675 g of the mixture comprising phenylhexaethylene glycol glycidyl ether represented by the following formula

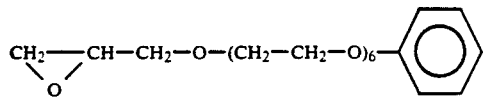

and propylene oxide (molar ratio 4:1) in the presence of potassium hydroxide. The product was purified with desalting to obtain 1,293 g of a polyether having an average molecular weight of 7,393 (calculated by hydroxide value).

The polyether and the 1.1 equivalent weight of p-vinyl benzoic acid to the hydroxide number of the polyether were added to benzene the used amount of which is identical with that of the p-vinyl benzoic acid. The mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-vinylated polyether having a molecular weight of 8,430 and a structure of the formula ①, in which

Z:

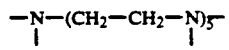

R$^1$:

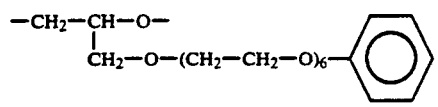

carbon number of R$^2$: 2
l: 2.1
m: 0.5
l/(l+m): 0.81
Y:

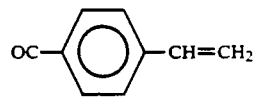

k: 8, was confirmed by measuring the bromine value and the saponification value.

3.6 g of thus obtained terminal-vinylated polyether, 0.11 g of NaClO$_4$ (0.015 mole/ether-bond oxygen) and 1% of a polymerization initiator were dissolved in 3 ml of methyl ethyl ketone and allowed to stand for 10 hours at 80° C. in a stream of nitrogen gas under atmospheric pressure. Then the solution was heat-treated for 8 hours at the same temperature in vacuum degree of below 1×10$^{-3}$ Torr to remove methyl ethyl ketone, and resultantly an ion-conductive polymer electrolyte having a thickness of 41 μm was obtained.

EXAMPLE 18

20 g of Bisphenol A as a starting material was reacted with 1,140 g of methyl dodecaethylene glycol glycidyl ether represented by the following formula

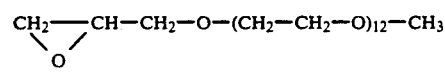

in the presence of potassium hydroxide as a catalyst and further reacted with 35 g of ethylene oxide. Then the product was purified with desalting to obtain 870 g of a polyether having an average molecular weight of 13,040 (calculated by hydroxide value) and a structure of a formula ①, in which

Z:

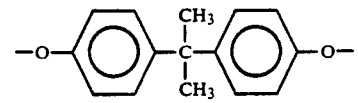

R$^1$:

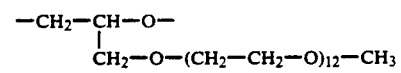

carbon number of R$^2$: 2
l: 10
m: 3.7
l/(l+m): 0.71
Y: H
k: 2.

3.6 g of thus obtained polyether, 0.10 g of NaSCN (0.015 mole/ether-bond oxygen number), 1.5 equivalent weight of hexamethylene diisocyanate to the above polyether and 0.01 g of dibutyltin dilaurate were dissolved in 3 ml of methyl ethyl ketone and then the mixture was poured into a flat vessel and allowed to stand for 30 minutes at 60° C. under atmospheric pressure in a stream of nitrogen gas. Then the solution was heat-treated for 8 hours at 80° C. in vacuum degree of below 1×10$^{-3}$ Torr to remove methyl ethyl ketone, resultantly an ion-conductive polymer electrolyte having a thickness of 41 μm was obtained.

EXAMPLE 19

20 g of monoethanolamine as a starting material was reacted with 1,630 g of phenyldiethylene glycol glycidyl ether represented by the following formula $$CH_2\!-\!\!\!\underset{O}{\underset{\diagdown\diagup}{CH}}\!\!\!-\!CH_2-O-(CH_2-CH_2-O)_2-C_6H_5$$

in the presence of 3 g of potassium hydroxide as a catalyst and further reacted with 192.6 g of ethylene oxide. Then the product was purified with desalting to obtain 1,032 g of a polyether having an average molecular weight of 5,010 (calculated by hydroxide value).

The polyether and the 1.1 equivalent weight of methacrylic acid to the hydroxide number of the polyether were added to benzene the used amount of which is identical with that of the methacrylic acid. The mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-methacrylated polyether having an average molecular weight of 11,890 and a structure of the formula ①, in which

Z:

$$\begin{array}{c} CH_2-CH_2-O-\\ |\\ N-\\ |\end{array}$$

$R^1$:

$$\begin{array}{c} -CH_2-CH-O-\\ |\\ CH_2-O-(CH_2-CH_2-O)_2-C_6H_5 \end{array}$$

carbon number of $R^2$: 2
l: 6.7
m: 1.4
l/(l+m): 0.83
Y: OCC(CH$_3$)=CH$_2$
k: 3, was confirmed by measuring the bromine value and the saponification value.

3.6 g of thus obtained terminal-methacrylated polyether, 0.13 g of LiClO$_4$ (0.020 mole/ether-bond oxygen number) and 1% of a polymerization initiator were dissolved in 3 ml of methyl ethyl ketone and allowed to stand for 10 hours at 80° C. in a stream of nitrogen gas under atmospheric pressure. Then the solution was heat-treated for 8 hours at the same temperature in vacuum degree of below $1\times10^{-3}$ Torr to remove methyl ethyl ketone, and resultantly an ion-conductive polymer electrolyte having a thickness of 41 μm was obtained.

EXAMPLE 20

20 g of ethylene glycol as a starting material was reacted with 6,430 g of the mixture comprising methyl glycidyl ether represented by the following formula $$CH_2\!-\!\!\!\underset{O}{\underset{\diagdown\diagup}{CH}}\!\!\!-\!CH_2-O-CH_3$$

and ethylene oxide (molar ratio 9:1) in the presence of 60 g of potassium hydroxide as a catalyst. The product was purified with desalting to obtain 5,810 g of a polyether having an average molecular weight of 19,060 (calculated by hydroxide value).

The polyether and the 1.1 equivalent weight of methacrylic acid to the hydroxide number of the polyether were added to benzene the used amount of which is identical with that of the methacrylic acid. The mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-methacrylated polyether having an average molecular weight of 19,190 and a structure of the formula ①, in which

Z:

$$\begin{array}{c} CH_2O-\\ |\\ CH_2O- \end{array}$$

$R^1$:

$$\begin{array}{c} -CH_2-CH-O-\\ |\\ CH_2-O-CH_3 \end{array}$$

carbon number of $R^2$: 2
l: 102.6
m: 10.8
l/(l+m): 0.90
Y: OCC(CH$_3$)=CH$_2$
k: 2, was confirmed by measuring the bromine value and the saponification value.

3.6 g of thus obtained terminal-methacrylated polyether, 0.09 g of LiClO$_4$ (0.020 mole/ether-bond oxygen number) and 1% of a polymerization initiator were dissolved in 3 ml of methyl ethyl ketone and allowed to stand for 10 hours at 80° C. in a stream of nitrogen gas under atmospheric pressure. Then the solution was heat-treated for 8 hours at the same temperature in vacuum degree of below $1\times10^{-3}$ Torr to remove methyl ethyl ketone, and resultantly an ion-conductive polymer electrolyte having a thickness of 48 μm was obtained.

COMPARATIVE EXAMPLE 2

18.4 g of glycerol as a starting material was reacted with 581.6 g of the mixture comprising ethylene oxide and propylene oxide (molar ratio 4:1) in the presence of 1.2 g of potassium hydroxide as a catalyst. Then the product was purified with desalting to obtain 459 g of a random polyether having an average molecular weight of 2,980 (calculated by hydroxide value).

3.6 g of thus obtained polyether, 0.12 g of LiClO$_4$, 1.5 equivalent weight of tolylene diisocyanate to the above polyether and 0.01 g of dibutyltin dilaurate were dissolved in 3 ml of methyl ethyl ketone and then the mixture was poured into a flat vessel and allowed to stand for 30 minutes at 60° C. under atmospheric pressure in a stream of nitrogen gas. Then the solution was heat-treated for 8 hours at 80° C. in vacuum degree of below $1 \times 10^{-3}$ Torr to remove methyl ethyl ketone, resultantly an ion-conductive polymer electrolyte having a thickness of 49 μm was obtained.

In each of the ion-conductive polymer electrolytes obtained in Examples 11 to 20 and Comparative Example 2, the ionic conductivity was measured. The results are shown in following Table 2.

TABLE 2

| | Ionic conductivity (S/cm) | | |
|---|---|---|---|
| | 20° C. | 0° C. | −20° C. |
| Example 11 | $3.2 \times 10^{-5}$ | $3.1 \times 10^{-6}$ | $3.8 \times 10^{-7}$ |
| 12 | $3.8 \times 10^{-5}$ | $3.6 \times 10^{-6}$ | $4.2 \times 10^{-7}$ |
| 13 | $3.7 \times 10^{-5}$ | $3.4 \times 10^{-6}$ | $3.9 \times 10^{-7}$ |
| 14 | $3.6 \times 10^{-5}$ | $3.2 \times 10^{-6}$ | $4.1 \times 10^{-7}$ |
| 15 | $3.0 \times 10^{-5}$ | $2.9 \times 10^{-6}$ | $3.6 \times 10^{-7}$ |
| 16 | $3.1 \times 10^{-5}$ | $2.9 \times 10^{-6}$ | $3.7 \times 10^{-7}$ |
| 17 | $3.4 \times 10^{-5}$ | $3.1 \times 10^{-6}$ | $4.0 \times 10^{-7}$ |
| 18 | $2.9 \times 10^{-5}$ | $2.7 \times 10^{-6}$ | $3.5 \times 10^{-7}$ |
| 19 | $2.9 \times 10^{-5}$ | $2.5 \times 10^{-6}$ | $3.2 \times 10^{-7}$ |
| 20 | $2.8 \times 10^{-5}$ | $2.6 \times 10^{-6}$ | $3.1 \times 10^{-7}$ |
| Comparative Example 2 | $2.5 \times 10^{-6}$ | $2.1 \times 10^{-7}$ | below $1.0 \times 10^{-8}$ |

As shown in Table 1 and Table 2, the ion-conductive polymer electrolyte according to the present invention shows good ionic conductivity stably even if it is put at the low temperature of not higher than 0° C., since it can be made amorphous completely by the presence of R$^1$ unit and R$^2$O unit. Further, the higher ionic conductivity can be obtained by the use of R$^1$ unit when the used amount of the soluble salt of electrolyte is small.

What is claimed is:

1. An ion-conductive polymer electrolyte comprising an organic polymer and a soluble electrolyte salt, characterized in that said organic polymer is obtained by crosslinking an organic compound having an average molecular weight of 1,000 to 20,000 and having a structure of the following general formula (1):

$$Z\text{-}[(R^1)_l\text{-}(R^2O)_m\text{-}Y]_k \quad (1)$$

in which

Z is a residue of a compound having at least one active hydrogen,

R$^1$ is a structure of the following general formula (2):

$$\begin{array}{c}-CH_2-CH-O-\\ |\\ CH_2-O(CH_2-CH_2-O)_n-R\end{array} \quad (2)$$

wherein n is 0 or an integer of 1 to 25,

R is a straight-chain or branched alkyl, alkenyl, aryl or alkylaryl group having 1 to 12 carbon atoms;

R$^2$ is an alkylene having 2 to 20 carbon atoms,

Y is a hydrogen atom, a group having at least one unsaturated bond or a Si-containing group, k is an integer of 1 to 12, l is an integer of 1 to 230, m is an integer of 1 to 300, and $l/(l+m) \geqq 0.1$.

2. An ion-conductive polymer electrolyte as defined in claim 1, wherein R$^2$ in said formula (1) is an alkylene having 2 or 3 carbon atoms, l is an integer of 1 to 220, m is an integer of 1 to 240 and $l/(l+m) \geqq 0.3$.

3. An ion-conductive polymer electrolyte as defined in claim 1, wherein R$^2$ in said formula is an alkylene having 4 to 20 carbon atoms and $l/(l+m) \geqq 0.2$.

4. An ion-conductive polymer electrolyte as defined in claim 1, wherein Y in said formula (1) is a hydrogen atom and said organic polymer is a thermosetting polymer crosslinked with a crosslinking agent.

5. An ion-conductive polymer electrolyte as defined in claim 1, wherein Y in said formula is a polymerizable functional group and said organic polymer is crosslinked by heat, light or electronic ray, with the use of a polymerization initiator and/or a sensitizer.

6. An ion-conductive polymer electrolyte as defined in claim 1, wherein Y in said formula is a polymerizable functional group and said organic polymer is crosslinked by heat, light or electronic ray.

* * * * *